Feb. 18, 1947. G. H. PARTIN 2,416,213
PARKING METER
Filed July 12, 1944 5 Sheets-Sheet 1

Inventor.
George H. Partin,
By
Dawson, Ooms and Booth,
Attorneys.

Feb. 18, 1947.  G. H. PARTIN  2,416,213
PARKING METER
Filed July 12, 1944   5 Sheets-Sheet 2

Inventor:
George H. Partin,
By Dawson, Ooms and Booth,
Attorneys.

Feb. 18, 1947. G. H. PARTIN 2,416,213
PARKING METER
Filed July 12, 1944 5 Sheets-Sheet 3
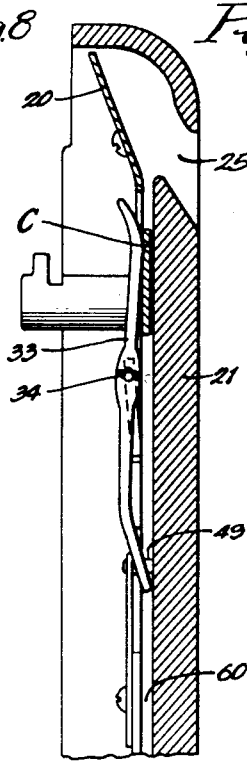
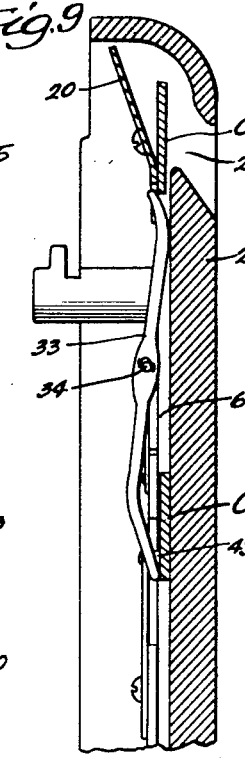
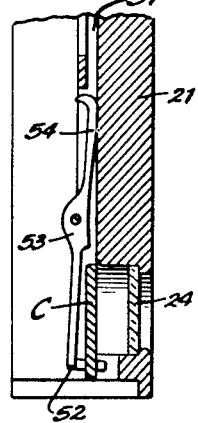
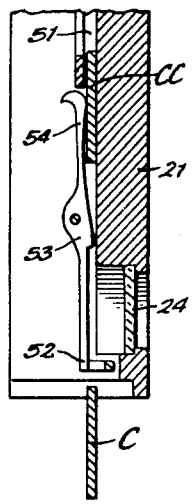
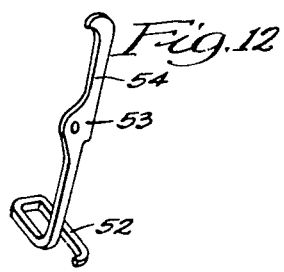
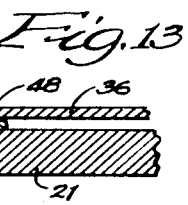
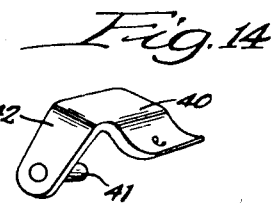
Inventor:
George H. Partin,
By Dawson, Ooms & Booth,
Attorneys.

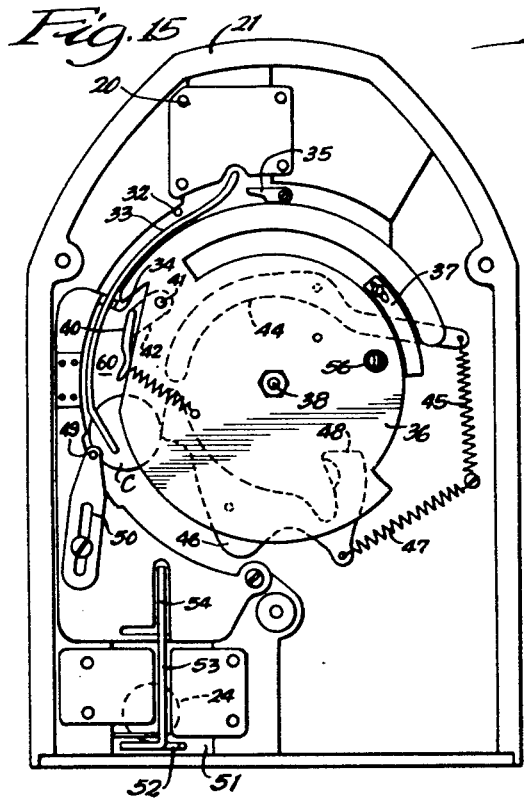
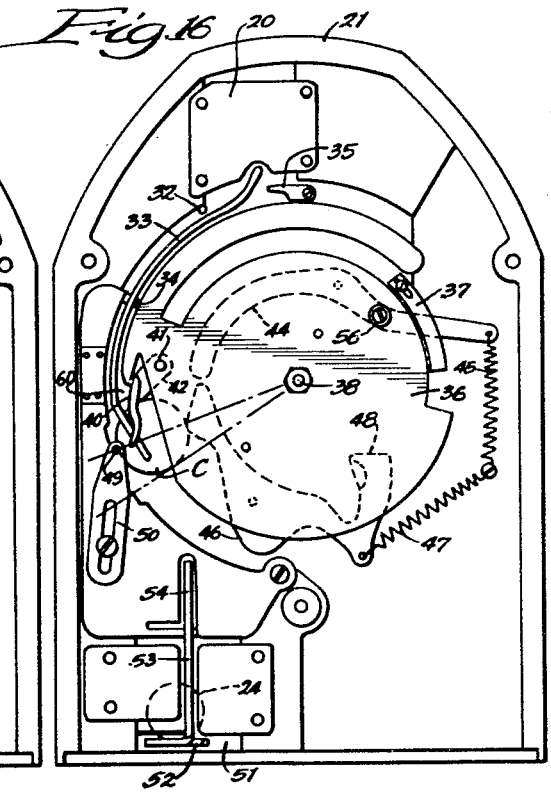

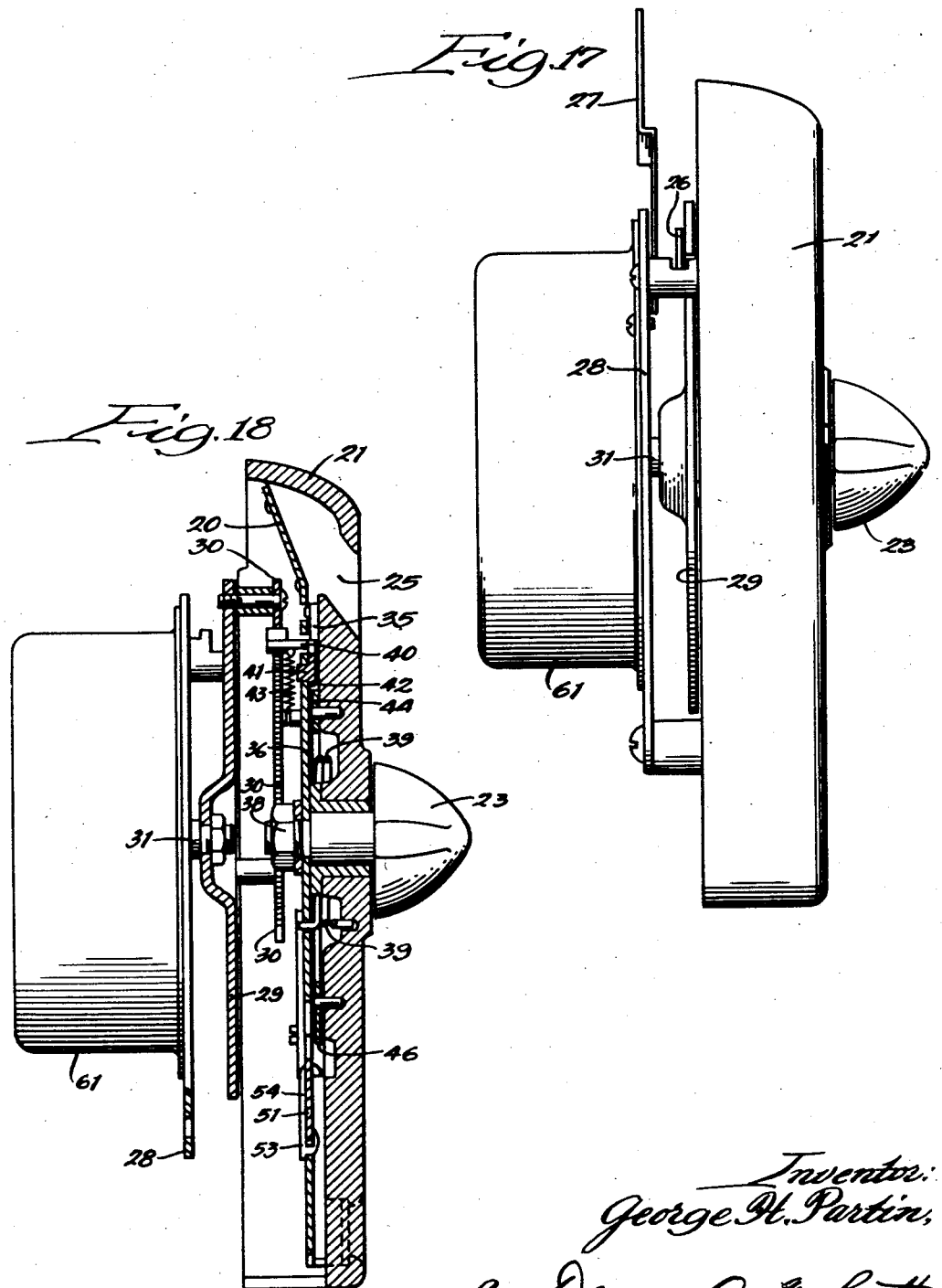

Patented Feb. 18, 1947

2,416,213

UNITED STATES PATENT OFFICE 2,416,213

PARKING METER

George H. Partin, Memphis, Tenn.

Application July 12, 1944, Serial No. 544,544

6 Claims. (Cl. 194—72)

This invention relates to parking meters and has for its purpose the provision of a coin operated parking meter which is positive in its action and practically foolproof.

One of the objects of the invention is to provide a parking meter which can be set to indicate a predetermined interval of time only when a coin of proper size has been inserted into the parking meter.

Another object of the invention is to provide a parking meter in which the operating handle can be turned when a coin has not been inserted without any disturbance of the setting mechanism or any danger to the parts thereof.

A further object of the invention is to provide a parking meter in which only one coin at a time can be inserted and which cannot be jammed by the insertion of a number of coins at the same time.

Another object of the invention is to provide a parking meter in which the motor is wound by rotation of the time indicator setting handle.

Still another object of the invention is to provide a parking meter which will display the coin last used to release the controls so that the insertion of spurious coins can readily be detected.

A further object of the invention is to provide a parking meter which, on each operation, will clear the coin last inserted in the machine so that no coin remains in operating or in position likely to jam the mechanism.

Another object of the invention is to provide a parking meter which can be used with two coins of different predetermined sizes so that the time indicator may be set to register one interval of time with the use of one coin and a different interval of time with the use of a coin of smaller denomination, and will permit the successive use of several coins of smaller denomination to set up an interval of time which is a multiple of the predetermined interval for each of such coins.

These and other features of the invention will be seen from the following detailed specification read in connection with the accompanying drawings forming part thereof and in which—

Fig. 8 is an enlarged view of the coin protection lever upon insertion of the coin with a section of the parking meter case taken on the line 8—8 of Fig. 3;

Fig. 9 is an enlarged view of the coin protection lever with a coin in operating position in the machine and insertion of additional coins barred by the lever;

Fig. 10 is the coin display device with a coin in display position, taken on the line 10—10 of Fig. 6;

Fig. 11 is the coin display device with the coin released as second coin enters coin receiving channel;

Fig. 12 shows the coin hanger of the coin display device;

Fig. 13 shows the coin clearing pin for clearing a coin from the machine when the machine is reset before time of first setting has expired, taken on the line 13—13 of Fig. 3;

Fig. 14 is an enlarged view in perspective of the setting pawl;

Fig. 15 is an interior view of the coin controls and setting mechanism in the first stage of operation upon insertion of a smaller coin than that shown in Figs. 4, 5, 6 and 7;

Fig. 16 shows an interior view of the coin controls and setting mechanism in an advanced stage of operation with the smaller coin;

Fig. 17 is an enlarged end elevational view of the parking meter; and

Fig. 18 is an enlarged elevational view in section taken centrally of Fig. 3.

Figure 1:
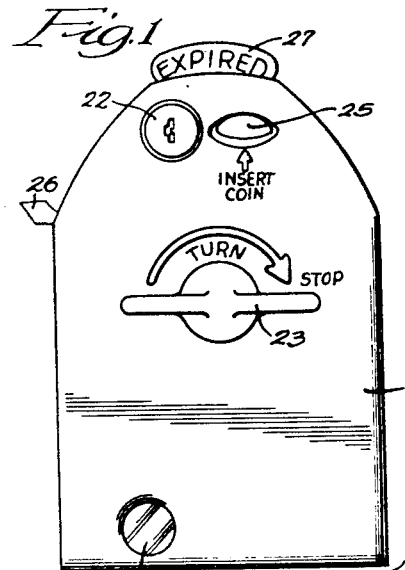
Fig. 1 is an exterior view of the parking meter case showing the operating handle and indicators.

Referring to the drawings, the parking meter operating mechanism case 21 is shown in Fig. 1. Mounted on the case are the lock 22, by which access to the interior may be effected, the operating handle 23, by which the parking meter is set into operation, the coin display window 24 for display of the coin last used to operate the meter, and the coin slot 25 for insertion of the coin used to unlock the setting mechanism. Also shown are the time interval indicator 26 and the time interval expiration flag 27. It is contemplated that the indicator 26 will be related to a time scale which is familiar in the art and which is calibrated to show intervals of time measured by the indicator which swings through an arc above the case 21.

Figure 2:
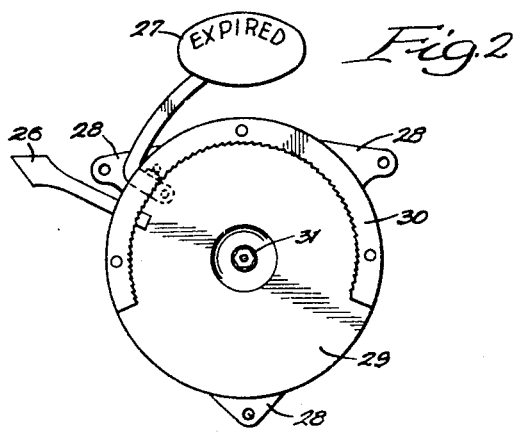
Fig. 2 is an interior view of the meter showing the setting rack, indicators, and motor case supports.

Shown in Fig. 2 are the motor case mountings 28 by which the motor case 61 is secured to the case 21. In front of the motor, which may be either power operated or spring operated, is the motor driven time plate 29 to which is secured the setting rack 30. The time plate 29 is clamped by a nut to the motor shaft 31 for rotation therewith. The motor is necessarily a constant speed motor regulated by an escapement mechanism or similar device which will drive the time plate 29 at a constant and predetermined speed.

The indicator 26 is secured to the time plate 29 and necessarily rotates with it. The time expiration flag 27 is pivoted to the motor mountings 28 so that it may normally remain out of sight but is elevated into view when the time plate 29 has reached the limit of its movement.

Whatever form of motor is employed in the parking meter, it is of a type which may be halted in its operation whenever the time plate 29 reaches the limit of its travel and may be started whenever the time plate 29 is moved by means of the setting rack 30 to any position within the limits of its range of movement. Obviously, as the motor operates it moves the time plate 29 by means of the drive shaft 31 toward the limit of movement of the time plate.

Figure 3:
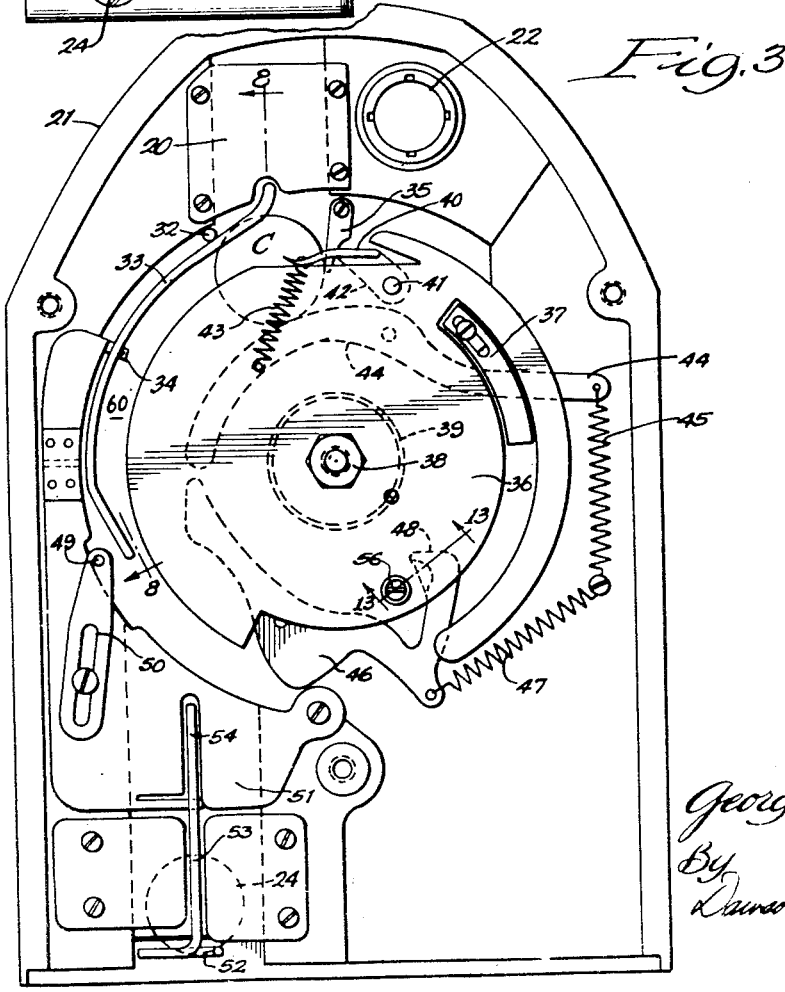
Fig. 3 is an enlarged interior view of the coin controls and setting mechanism.

Referring to Fig. 3, showing the interior of the setting mechanism by which upon insertion of a coin the mechanism may be set into operation, there is a coin slot back plate 20 back of the coin slot 25 which directs any coin C into the coin channel 60. Within the coin channel 60 is the coin retainer pin 32 and the coin protection lever 33 pivoted at 34 so that it may swing with the passage of a coin through the coin channel 60. Directly beneath the opening of the coin channel is the coin bar 35, pivotally suspended so that upon any rotation of the setting handle 23, the setting plate 36 will swing the bar 35 beneath the coin slot back plate 20 and prevent the entry of coins into the coin channel 60.

The setting plate 36 is secured to the setting shaft 38 and thereby to the setting handle 23 so that rotation of the setting handle 23 will rotate the setting plate. Adjustable stop 37 including abutments at each end thereof is set to limit the range of movement of the setting plate. Surrounding the setting plate shaft 38 is the setting plate return spring 39 by which the plate is returned to its normal position after rotation.

Pivoted at 41 to the setting plate 36 is the setting pawl 40 which is held within the periphery of the setting plate by means of the spring 43. The pawl is so shaped as to provide the cam 42 on its lower surface so that rotation of the setting plate 36 will bring the pawl into engagement with any coin that may be held in the coin channel 60.

Pivoted to the case 21 beneath the setting plate 36 is the coin engagement lever 44 held in advanced position by means of the spring 45. Similarly mounted beneath the setting plate is the small coin engagement lever 46 held in advanced position by means of the spring 47. The small coin engagement lever 46 is shaped to provide a tail 48 which serves as a cam for engagement with the coin clearing pin assembly 56 to be hereinafter described.

Adjustably located in the coin channel 60 is the small coin retainer pin 49, the position of which in the channel may be adjusted by means of the adjustment plate 50.

Below the coin channel 60 is the coin release chute 51 through which coins passing from the coin channel are discharged from the meter case. Pivotally suspended in the coin release chute is the coin display hanger 52 which forms the lower end of the coin display lever 53, the upper end of which 54 serves as a trip.

As shown in Fig. 13, the coin clearing pin assembly 56 mounted in the setting plate 36 is comprised of the coin clearing pin tube 57 containing the coin clearing pin 58 and the spring 59.

Method of setting parking meter

Figure 4:
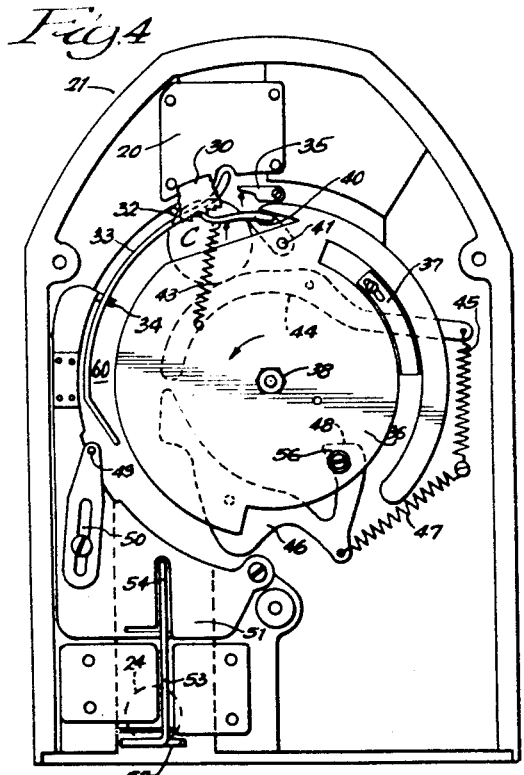
Fig. 4 is an interior view of the coin controls upon the insertion of a coin and the beginning of the operation of the setting mechanism.

As shown in Figs. 3 to 7 inclusive, the parking meter is set by means of the setting plate 36 after a coin C has been inserted into the coin slot 25. The coin, upon entering, is directed by the coin slot back plate 20 into the coin channel 60. It remains at the head of the coin channel 60 because of its engagement with the coin retainer pin 32 and engagement of the coin with the coin engagement lever 44 which is advanced by the spring 45 so as to press the coin against the retainer pin 32. As the setting plate is rotated by means of the setting handle 23 in a clockwise direction (the motion being counter-clockwise in the views 3 to 7 inclusive) the setting pawl cam 42 strikes the coin C and elevates the pawl 40 into engagement with the setting rack 30, a fragment of which is shown in Fig. 4. Thereupon further rotation of the setting plate drives the coin through the coin channel 60 and moves the setting rack 30 to set the indicator 26 to indicate the interval of available time which the setting of the meter is designed to indicate.

Figure 5:
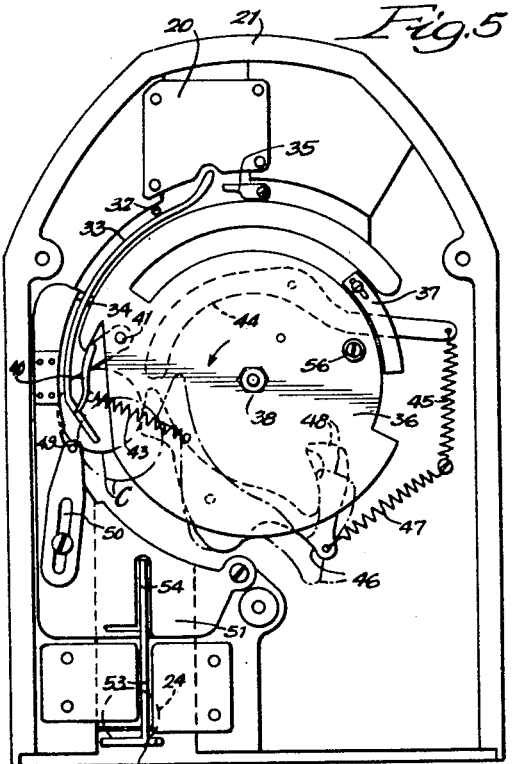
Fig. 5 is an interior view of the coin controls with the setting operation almost completed.
Figure 6:
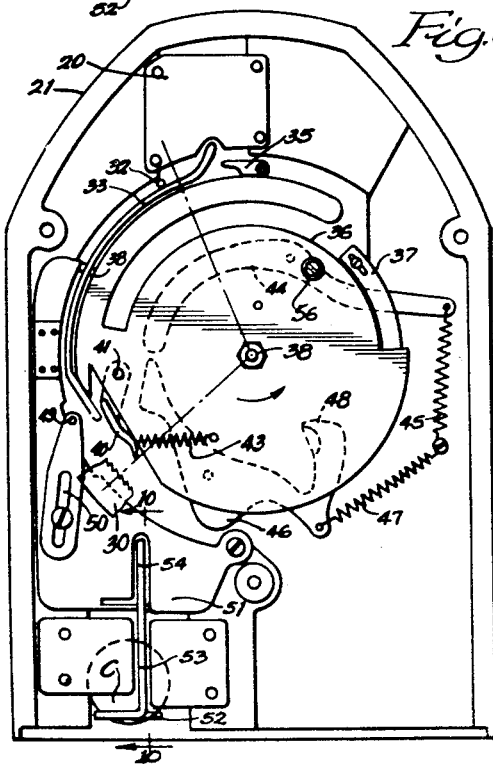
Fig. 6 is an interior view of the coin controls with the setting operation completed and the coin cleared.

As shown in Figs. 4 and 5, as the setting plate 36 is rotated the periphery of the plate strikes the coin bar 35 and moves it into a position beneath the coin slot to prevent the entry of other coins while the setting plate is out of its at rest position. As the coin is advanced from the position shown in Fig. 4 to that shown in Fig. 5, the coin engagement lever 44 first yields to the coin being driven through the coin channel 60 and then resumes its normal position. At about the time the coin strikes the second retainer pin 49, the coin engages the small coin engagement lever 46 and is pressed against the pin 49 by that lever. As the coin is driven down the channel by further movement of the setting plate the lever 46 retreats until the coin clears the nose of the lever whereupon the lever resumes its normal position and the coin enters the coin release chute 51.

Operation of coin clearing pin

As long as the pawl 40 remains in engagement with the setting rack 30 the setting rack is driven forward and the indicator 26 correspondingly moved until the setting rack has been moved to the limit of its range of movement. If at the time the setting handle is first turned the indicator 26 is not in its exhausted position but shows an interval of time remaining unexhausted, the setting rack 30 cannot be moved throughout its full path of travel but reaches its limit before the setting handle has been turned a half revolution. This may occur at a time when the coin is positioned in the coin channel and has not yet cleared the engagement lever 46.

Figure 7:
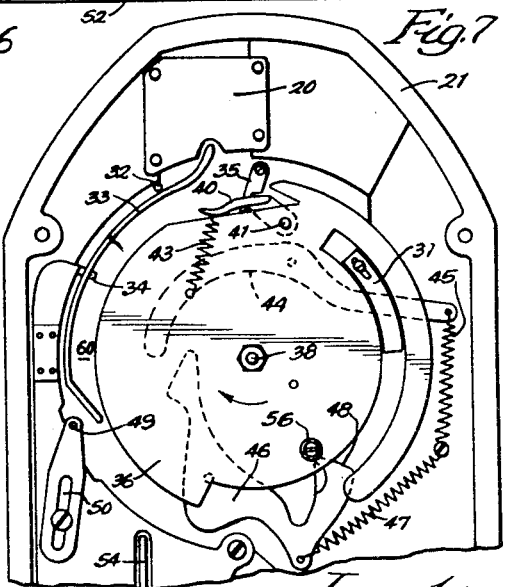
Fig. 7 is an interior view of the coin controls reset upon return of the setting handle and setting mechanism.

In order to clear a coin remaining in the coin channel under those conditions, the setting plate 36, as it returns from its advanced position to its normal position, carries with it the coin clearing pin 58 which strikes the tail of the engagement lever 46 and moves the lever, as shown in Fig. 7, freeing any coin that may be at rest in the coin channel 60 and permitting it to drop into the coin release chute 51. If a large coin remains in the coin channel 60 adjacent the engagement lever 44 it may be subsequently advanced to the release chute by the next coin inserted in and advanced through the meter.

Method of setting parking meter by smaller coins

The operation of the parking meter with a smaller coin than that discussed in describing the operation shown in Figs. 4 to 7 inclusive, is illustrated in Figs. 15 and 16. The smaller coin is not stopped by the retainer pin 32 at the head of the coin chute 60, but falls immediately to the bottom of the coin chute where it encounters the small coin engagement pin 49 against which the coin is pressed by the nose of the small coin engagement lever 46. With the coin in this position as illustrated in Fig. 15, the setting handle is turned and the setting plate 36 rotates until the pawl 40 strikes the coin and is raised by the cam 42 into engagement with the setting rack 30. Thereupon, further movement of the setting handle 23 moves the setting rack a measured distance, determined by the length of travel of the setting plate. Obviously, as the setting rack is moved it carries with it the indicator 26 and sets up on the parking meter the available interval of time which the meter is designed to register.

As the pawl is advanced with the turning of the setting plate 36, it pushes the coin beyond the nose of the small coin engagement lever 46 whereupon the coin is free to drop into the coin release chute 51.

The amount of time which the small coin is to set up on the parking meter can be controlled within a narrow range by means of the retainer pin adjustment plate 50 which can be raised or lowered to shorten or length the path of travel of the setting plate 36 while the pawl is in engagement with the setting rack. Normally the setting of the pin 49 will be determined by the relation of the value of the small coin for which the meter is designed, to the value of the larger coin by which the meter is also operable.

If the larger coin is a five cent piece or nickel and the smaller coin a penny, the length of travel of the setting rack when the setting controls are actuated by a penny could be made one-fifth or one-sixth of the length of travel to which the setting rack would be subjected when a five cent piece was used to release the parking meter.

One feature of this invention is that when a smaller coin, such as a penny, is used, the meter may be operated with a succession of such smaller coins and as the setting rack is moved the same distance with each operation of the coin, the movement of the setting rack can be accumulated and the meter set up for a great variety of time intervals. Thus, if the machine were designed to set up an interval of one hour by use of a nickel, and an interval of ten minutes when a penny was used to release the setting mechanism, two, three or more pennies could be used in succession to set the meter for an available interval of twenty, thirty, or more minutes.

Operation of coin protection lever

The coin protection lever 33 is shown in each of the Figs. 3 to 7 inclusive, and 15 and 16, and also in enlarged view in Figs. 8 and 9. The lever is generally arcuate in form to conform to the general path of the coin channel 60 over which the lever is pivoted at the pivot 34.

The lever is so formed that as shown in Figs. 8 and 9, a coin C can clear the upper portion of the lever in passing down the coin channel. When the coin C moves under the lower or tail end of the lever 33, the upper end is swung into the coin channel and obstructs the path of any second coin CC that may be inserted in the coin slot 25. Normally the coin passes under the lower or tail end of the lever 33 before another coin can be inserted in the coin slot 25 and reach the upper end of said lever.

The coin protection lever thus normally prevents the insertion of a plurality of coins which, if permitted to accumulate in the coin channel 60, might jam the coin channel and interfere with the proper operation of the setting mechanism.

Of course after the setting plate 36 has been moved forward, even to a slight extent, it moves the coin bar 35 into the opening of the coin channel and forms a further barrier to the introduction of a coin when the machine is not prepared to receive it.

Operation of the coin display hanger

The coin display hanger lever 53 is pivotally hung in the coin release chute 51, as shown in Figs. 3 to 7 inclusive, and 15 and 16. It is also shown in the enlarged view in Figs. 10 and 11.

As the coin C passes into the coin release chute after it has cleared through the coin channel 60, it falls through the coin release chute 51 and into the hanger 52 at the lower end of the hanger lever 53. The weight of the coin in the hanger moves the upper end or trip 54 into the coin release chute and into the path of any subsequent coin CC that may drop into the coin release chute 51. As the coin CC strikes the trip 54, it swings the coin display hanger lever 53 forward and frees the coin C from the hanger 52. The coin may thereupon drop into an appropriate receptacle for the coins (not shown). The coin CC thereupon continues its passage in the coin release chute 51 and swings the coin display hanger lever 53 back into position for the hanger 52 to receive the coin.

While the coin C is held in the coin display hanger it is observable through the window in the casing 21 and thus forms a visible disclosure at all times of the coin which was last used to operate the parking meter, thus discouraging the use of spurious coins.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A parking meter comprising a motor, an indicator, means for driving the indicator by the motor in one direction, a rack secured to the indicator, a pivoted pawl engageable with the rack, a setting plate carrying the pawl, a handle for turning the setting plate, a coin channel for the passage of coins through the parking meter, means to restrain the movement of the coin through the coin passage, and cam means in the coin channel to swing the pawl into engagement wtih the rack when the cam means encounters a coin held in the coin channel to rotate the rack and indicator in the opposite direction.

2. A parking meter comprising a motor, an indicator, means for driving the indicator by the motor in one direction, a rotatable setting rack secured to the indicator, a setting handle, a setting plate secured to the handle, a pawl pivoted to the setting plate, a coin channel for the passage of coins therethrough, a retainer to detain a coin in the coin channel, cam means in the coin channel to drive the coin therethrough and to swing the pawl into engagement with the rack when the cam means encounters a coin detained in the coin channel to rotate the rack and indicator in the opposite direction, and conditioned means to release a coin from the coin channel after the setting plate has been initially moved a predetermined amount.

3. A parking meter comprising a motor, an indicator, means for driving the indicator by the motor in one direction, a setting rack secured to the motor and indicator, a setting handle, a rotatable setting plate secured to the handle, a pawl pivoted to the setting plate, a coin channel, a retainer to detain a coin in the coin channel, a cam on the pawl to engage a coin held in the coin channel to drive the coin therethrough and thereupon to swing the pawl into engagement with the rack to rotate the rack and indicator in the opposite direction, yielding means to hold the coin in the coin channel at the end of its travel therein, and means on the setting plate conditioned to operate the yielding means to free a coin from the channel after the setting plate has been initially moved a predetermined amount.

4. A parking meter comprising a motor, an indicator, means for driving the indicator by the motor in one direction, a setting rack secured to the motor and indicator, a setting handle, a rotatable setting plate secured to the handle, a pawl pivoted to the setting plate, a coin channel, a retainer to detain a coin of predetermined size in the coin channel, a second retainer in the coin channel to retain coins of smaller size in the coin channel, a cam on the pawl to engage a coin held in the coin channel to drive the coin therethrough and thereupon to swing the pawl into engagement with the rack to rotate the rack and indicator in the opposite direction, yielding means to hold the coin in the coin channel at the end of its travel therein, and means on the setting plate conditioned to operate the yielding means to free a coin from the channel after the setting plate has been initially moved a predetermined amount.

5. A parking meter comprising a motor, an indicator means for driving the indicator by the motor in one direction, a setting rack secured to the motor and indicator, a setting handle, a rotatable setting plate secured to the handle, a pawl pivoted to the setting plate, a coin channel, an abutment in the coin channel to detain a coin of predetermined size therein and to permit smaller coins to pass, a yielding lever to force the coin against the pin, a second abutment in the coin channel to detain coins of smaller size therein, a second yielding lever to force coins of both sizes against the second abutment, a cam on the pawl to engage a coin held in the coin channel to drive the coin therethrough and thereupon to swing the pawl into engagement with the rack to rotate the rack and indicator in the opposite direction, and means on the setting plate conditioned to operate the second yielding means after the setting plate has been initially moved a predetermined amount.

6. A parking meter comprising a motor, an indicator means for driving the indicator by the motor in one direction, a setting rack secured to the motor and indicator, a setting handle, a rotatable setting plate secured to the handle, a coin channel, an abutment in the coin channel to detain a coin therein, a yielding lever at the end of the coin channel to detain a coin therein, a pawl pivoted to the setting plate and engageable by a coin detained in the coin channel so as to be forced into engagement with the rack to rotate the rack and indicator in the opposite direction and to drive the coin through and from the coin channel as the setting plate is turned, and means upon the setting plate conditioned to operate the yielding lever to free a coin from the coin channel after the setting plate has been initially moved a predetermined amount.

GEORGE H. PARTIN.

REFERENCES CITED

The following references are of record in the file of this patent:

UNITED STATES PATENTS

| Number | Name | Date |
|---|---|---|
| 1,562,771 | Jennings | Nov. 24, 1925 |
| 1,926,232 | Gilmore | Sept. 12, 1933 |
| 2,252,253 | Ferguson | Aug. 12, 1941 |
| 2,304,012 | Neff | Dec. 1, 1942 |